(12) United States Patent
Kim

(10) Patent No.: US 7,052,076 B2  
(45) Date of Patent: May 30, 2006

(54) FRONT SIDE-PART STRUCTURE OF VEHICLE

(75) Inventor: Ki-Chang Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,243

(22) Filed: Dec. 30, 2003

(65) Prior Publication Data  
US 2004/0207234 A1 Oct. 21, 2004

(30) Foreign Application Priority Data  
Apr. 15, 2003 (KR) ................... 10-2003-0023676

(51) Int. Cl.  
*B62D 25/08* (2006.01)

(52) U.S. Cl. .................... 296/187.09; 296/193.09; 296/198; 296/30

(58) Field of Classification Search ........... 296/187.09, 296/193.09, 198, 203.02, 30  
See application file for complete search history.

(56) References Cited

U.S. PATENT DOCUMENTS

| | | | | |
|---|---|---|---|---|
| 5,184,868 A | * | 2/1993 | Nishiyama | 296/187.09 |
| 6,364,401 B1 | * | 4/2002 | Kim | 296/203.02 |
| 6,648,401 B1 | * | 11/2003 | Behnke et al. | 296/198 |
| 2004/0164591 A1 | * | 8/2004 | Tsukahara | 296/193.09 |

FOREIGN PATENT DOCUMENTS

| JP | 404303075 A | * | 10/1992 | 296/203.02 |
|---|---|---|---|---|
| JP | 410129523 A | * | 5/1998 | |
| JP | 2001-18837 | | 1/2001 | |

* cited by examiner

*Primary Examiner*—Jason Morrow  
(74) *Attorney, Agent, or Firm*—Morgan Lewis & Bockius LLP

(57) ABSTRACT

A front side-part structure of a vehicle includes a reinforcing member forming a closed section with a fender apron upper panel, fender apron inner panel, and front side member improves a coupling rigidity therebetween. Resulting from the improved rigidity, the fender apron upper panel firmly supports a front-end module, and limiting vibration generated from a coupling portion between the fender apron upper panel and front-end module. The improved rigidity also increasing the driving stabilization by firm stiffness of the vehicle body during a sudden stop or a turn.

10 Claims, 3 Drawing Sheets

FRONT SIDE-PART STRUCTURE OF VEHICLE

CROSS-REFERENCE TO RELATED APPLICATIONS

This application claims priority to Korean Application No. 10-2003-0023676, filed on Apr. 15, 2003, the disclosure of which is incorporated fully herein by reference.

FIELD OF THE INVENTION

Generally, the present invention relates to a structure for a vehicle body. More particularly the structure relates to a front side-part structure of a vehicle that includes a coupling structure for a fender apron and a front side member.

BACKGROUND OF THE INVENTION

In general, vehicle front side members make up a skeleton construction of an engine compartment near the front of vehicles The front side members also provide a reinforcement for installing an engine and a transmission within the vehicle. A fender apron is mounted at an external lateral side of the front side member. The fender apron typically includes a fender apron inner panel and a fender apron upper panel. The fender apron inner panel directly couples to a lateral side of the front side member, while the fender apron upper panel, coupling to the fender apron inner panel, is disposed at an upper external side of the front side member.

The fender apron upper panel includes an installation part of a front-end module integrally assembled with a headlamp, hood latch, radiator, and electric fan to the front-end carrier. Accordingly, an important feature of the fender apron upper panel is to provide a sufficiently rigid mounting structure to tightly support the front-end module.

SUMMARY OF THE INVENTION

Embodiments of the present invention provide a front side-part structure of a vehicle adapted to provide a coupling of sufficient rigidity between a fender apron and a front side member for allowing a fender apron upper panel to firmly support a front-end module, thereby limiting vibrations generated from the coupling portion of the fender apron upper panel and front-end module and improving driving stability of the vehicle during sudden stops or turns.

In a preferred embodiment of the present invention, a front side-part structure of a vehicle comprises a front side member. A fender apron inner panel is mounted at a lateral side of the front side member. A fender apron upper panel is mounted at a lateral side of the fender apron inner panel. A reinforcing member couples with the fender apron upper panel, fender apron inner panel, and front side member.

BRIEF DESCRIPTION OF THE DRAWINGS

For a better understanding of the nature and objects of the present invention, reference should be made to the following detailed description read in conjunction with the accompanying drawings, in which.

DETAILED DESCRIPTION OF A PREFERRED EMBODIMENT

Figure 1:
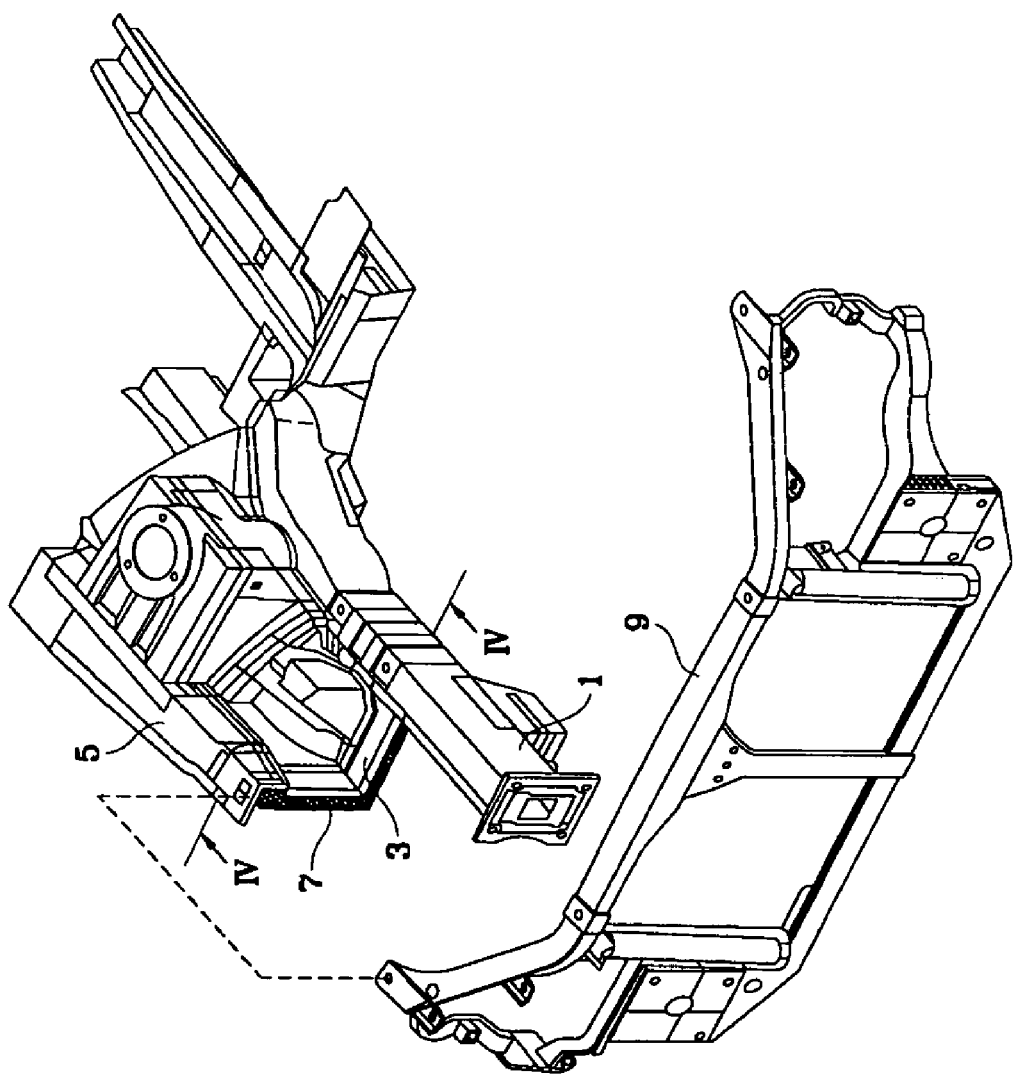
FIG. 1 illustrates a front side-part structure of a vehicle according to an embodiment of the present invention.

As shown in FIG. 1, a front side-part structure of a vehicle comprises a front side member 1. A fender apron inner panel 3 is mounted to a lateral side of the front side member 1. A fender apron upper panel 5 is mounted to a lateral side of the fender apron inner panel 3. A reinforcing member 7 couples with the fender apron upper panel 5, fender apron inner panel 3, and front side member 1. A front-end carrier 9 is installed to the fender apron upper panel 5.

A front-end module refers to the front-end carrier 9 being installed with a headlamp, hood latch, bumper, radiator, and electric fan. The front-end module is mounted to the fender apron upper panel 5. The fender apron inner panel 3 couples, at one end, to the front side member 1, while the other end couples to the fender apron upper panel 5 by being bent upward. Therefore, the fender apron inner panel 3 obtains a L-shaped cross-section.

Figure 4:
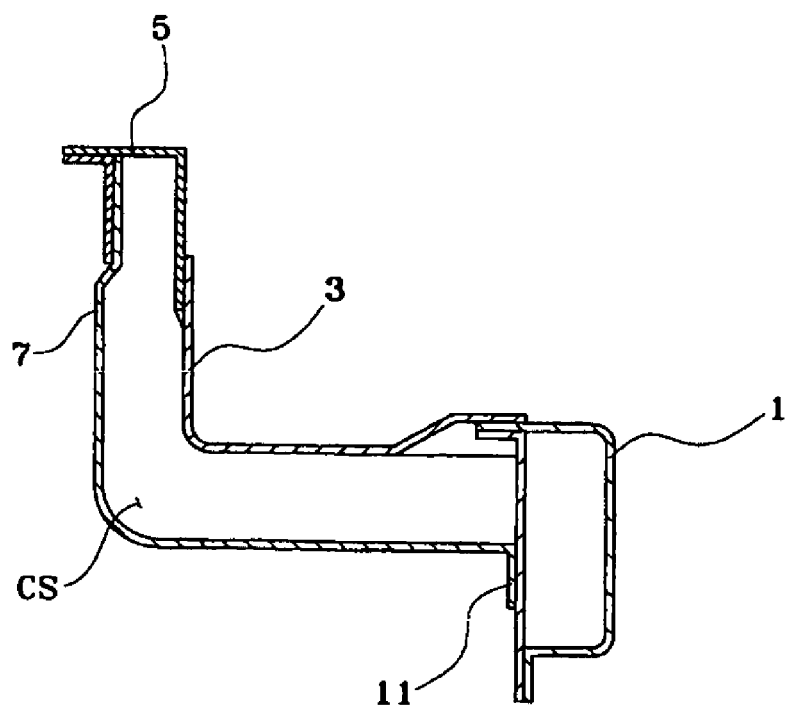
FIG. 4 is a cross-sectional view taken along line IV—IV of FIG. 1.

As shown in FIG. 4, the reinforcing member 7 has a channel shaped cross-section. The channel shaped cross-section is formed as a closed section (CS) by coupling with the fender apron upper panel 5, fender apron inner panel 3, and front side member 1. The cross-section of the reinforcing member 7 extends perpendicularly along a longitudinal direction of the fender apron upper panel 5, fender apron inner panel 3, and front side member 1. When observed from the front of the vehicle, the reinforcing member 7 is also in an L-shape corresponding to the shape of the fender apron inner panel 3.

Figure 2:
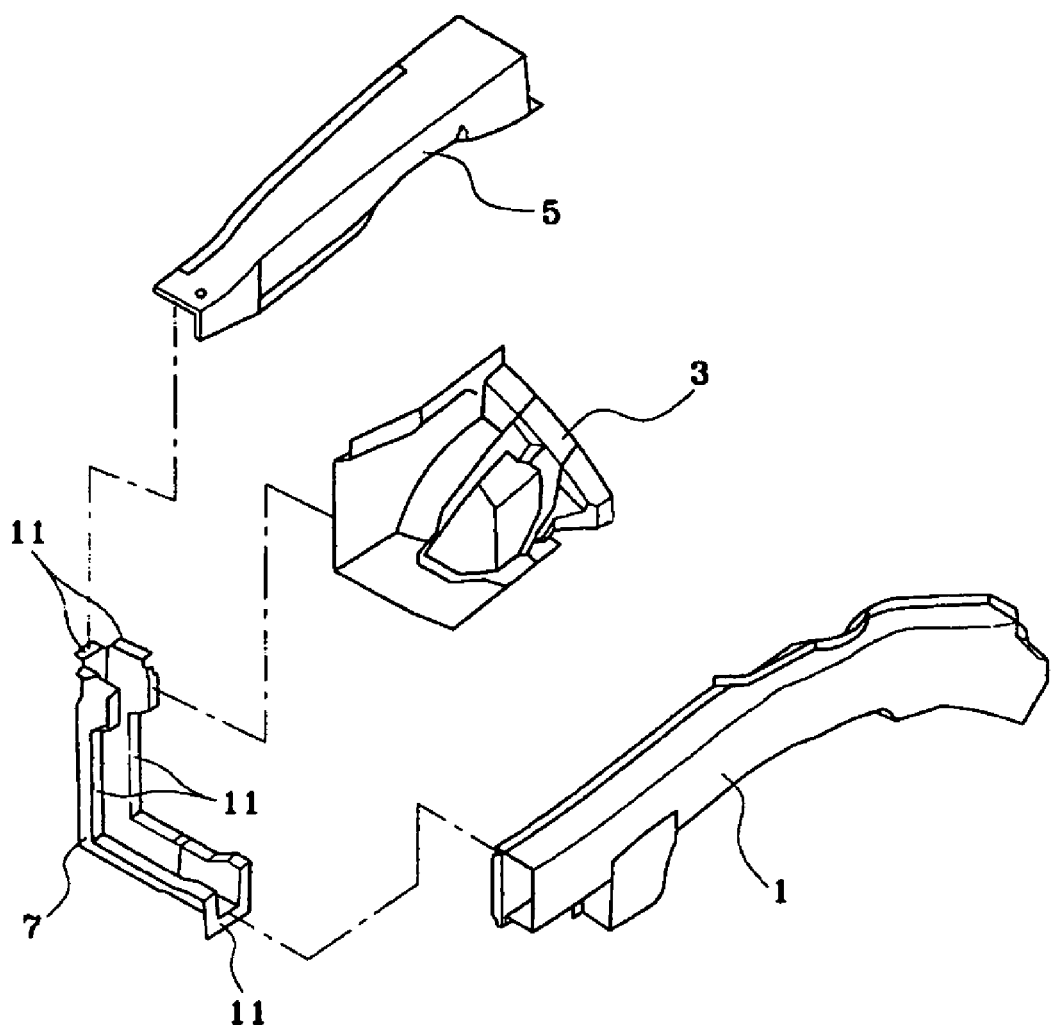
FIG. 2 is an exploded perspective view illustrating principle components of FIG. 1 according to an embodiment of the present invention.
Figure 3:
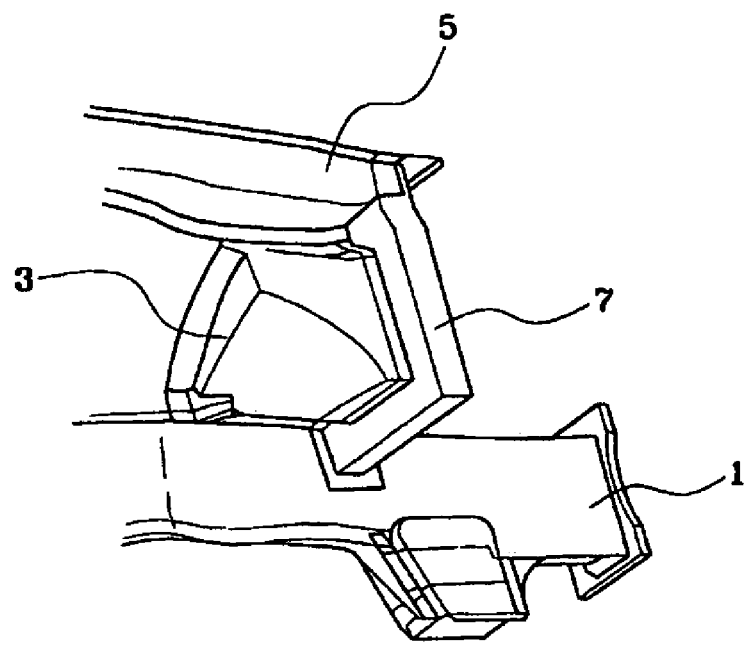
FIG. 3 illustrates a lateral rear side view of a front side-part structure according to an embodiment of the present invention.

According to FIGS. 2 and 4, the channel shaped cross-section is formed by two facing side surfaces and a surface connecting two end portions of the two facing side surfaces. The coupling portion of the reinforcing member 7, which couples with the fender apron upper panel 5, fender apron inner panel 3, and front side member 1 is formed with flanges 11 for contacting surfaces of the fender apron upper panel 5, fender apron inner panel 3, and front side member 1.

The closed section of the reinforcing member 7, formed by coupling with the fender apron upper panel 5, fender apron inner panel 3, and front side member 1 has a preferably rectangular cross-section. The reinforcing member 7 is further provided with a sufficient rigidity by the flanges 11 at the position for coupling to the fender apron upper panel 5, fender apron inner panel 3, and front side member 1. The reinforcing member 7 may also have a U-shaped cross-section with the flanges therearound for coupling to the fender apron upper panel 5, fender apron inner panel 3, and front side member 1. The reinforcing member 7 forming a closed section (CS) with the fender apron upper panel 5, fender apron inner panel 3, and front side member 1 allows the fender apron upper panel 5 to firmly contact the front side member 1 via the fender apron inner panel 3 and the reinforcing member 7.

The fender apron upper panel 5 provides a sufficient supporting rigidity to firmly couple with the front-end module, thereby obtaining stiffness of the vehicle body even during a sudden stop or a turn and improving the driving stabilization of the vehicle.

As apparent from the foregoing, there are advantages in the front side-part structure of a vehicle according to an embodiment of the present invention in that the reinforcing member forms a closed section with the fender apron upper panel, fender apron inner panel, and front side member. The structure with a closed section allows the fender apron upper panel to firmly support the front-end module. As a result of firmly supporting the front-end module vibrations generated from the coupling portion of the fender apron upper panel and the front-end module are further restricted. This in turn improves the driving stability when a vehicle makes a sudden stop or a turn, resulting from a sufficient rigidity of the vehicle body.

What is claimed is:

1. A front side-part structure of a vehicle, comprising:
   a front side member;
   a fender apron inner panel disposed at a lateral side of said front side member;
   a fender apron upper panel disposed at a lateral side of said fender apron inner panel; and
   a reinforcing member coupled with said fender apron upper panel, fender apron inner panel, and front side member, wherein said reinforcing member is disposed laterally outwardly from said fender apron inner panel.

2. The structure as defined in claim 1, wherein said fender apron inner panel is coupled at one end to said front side member, and the other end thereof is coupled to said fender apron upper panel by being upwardly bent.

3. The structure as defined in claim 2, wherein said reinforcing member has a channel shaped cross-section for forming a closed section by coupling with said fender apron upper panel, fender apron inner panel, and front side member; and
   said channel shaped cross-section perpendicularly extends along a longitudinal direction of said fender apron upper panel, fender apron inner panel, and front side member.

4. The structure as defined in claim 3, wherein said channel shaped cross-section is formed by two facing side surfaces and a surface connecting two end portions of said two facing side surfaces; and
   a coupling portion of said reinforcing member to said fender apron upper panel, fender apron inner panel, and front side member is formed with flanges therearound for contacting surfaces of said fender apron upper panel, fender apron inner panel, and front side member.

5. A front side-part structure of a vehicle, comprising:
   a front side member;
   a fender apron inner panel disposed along an outer lateral side of said front side member;
   a fender apron upper panel disposed at a lateral side of said fender apron inner panel; and
   a reinforcing member disposed laterally outward from the fender apron inner panel and coupled with said fender apron upper panel, fender apron inner panel, and front side member.

6. The structure as defined in claim 5, wherein said reinforcing member is configured to form a closed cross-section with said fender apron inner panel.

7. The structure as defined in claim 6, wherein said reinforcing member has a channel-shaped cross-section.

8. The structure as defined in claim 7, wherein said reinforcing member includes flanges disposed along edges of said channel shape.

9. A front side-part structure of a vehicle, comprising:
   a front side member;
   a fender apron inner panel disposed at a lateral side of said front side member;
   a fender apron upper panel disposed at a lateral side of said fender apron inner panel; and
   a reinforcing member coupled with said fender apron upper panel, fender apron inner panel, and front side member;
   wherein said fender apron inner panel is coupled at one end to said front side member, and the other end thereof is coupled to said fender apron upper panel by being upwardly bent; and
   wherein said reinforcing member has a channel shaped cross-section for forming a closed section by coupling with said fender apron upper panel, fender apron inner panel, and front side member, and said channel shaped cross-section perpendicularly extends along a longitudinal direction of said fender apron upper panel, fender apron inner panel, and front side member.

10. The structure as defined in claim 9, wherein said channel shaped cross-section is formed by two facing side surfaces and a surface connecting two end portions of said two facing side surfaces; and
    a coupling portion of said reinforcing member to said fender apron upper panel, fender apron inner panel, and front side member is formed with flanges therearound for contacting surfaces of said fender apron upper panel, fender apron inner panel, and front side member.

* * * * *